United States Patent [19]

Kramer

[11] Patent Number: 4,577,379
[45] Date of Patent: Mar. 25, 1986

[54] BEARING ASSEMBLY AND METHOD FOR ASSEMBLING A BEARING

[75] Inventor: James H. Kramer, Akron, Ohio

[73] Assignee: The B. F. Goodrich Company, Akron, Ohio

[21] Appl. No.: 632,915

[22] Filed: Jul. 20, 1984

Related U.S. Application Data

[62] Division of Ser. No. 525,521, Aug. 22, 1983, Pat. No. 4,473,308.

[51] Int. Cl.⁴ .................. B21D 53/10; B31C 13/00; B65H 81/00; B32B 1/00
[52] U.S. Cl. .................. 29/149.5 S; 29/149.5 C; 29/149.5 NM; 29/DIG. 25; 156/192; 156/264; 384/98
[58] Field of Search .............. 29/149.5 S, 149.5 R, 29/149.5 C, 149.5 NM, 149.5 PM, DIG. 25; 156/192, 264; 384/97, 98

[56] References Cited

U.S. PATENT DOCUMENTS

| | | | |
|---|---|---|---|
| 1,174,942 | 3/1916 | Bache | 29/149.5 R X |
| 1,422,655 | 7/1922 | Brehmer | 29/149.5 R |
| 1,603,470 | 10/1926 | Johnson et al. | 29/149.5 R |
| 2,215,523 | 9/1940 | Haushalter | 29/149.5 NM |
| 2,227,969 | 1/1941 | Haushalter | 29/149.5 NM |
| 3,606,505 | 9/1971 | Satterthwaite et al. | 384/98 |
| 3,772,120 | 11/1973 | Radzins | 156/264 |
| 3,826,547 | 7/1974 | Finefrock | 384/98 |
| 3,993,371 | 11/1976 | Orndorff, Jr. | 384/97 |
| 4,149,761 | 4/1979 | Telle | 384/98 |
| 4,344,806 | 8/1982 | Kramer | 156/192 X |
| 4,410,285 | 10/1983 | Strasser et al. | 308/DIG. 8 X |

FOREIGN PATENT DOCUMENTS

| | | | |
|---|---|---|---|
| 668218 | 11/1938 | Fed. Rep. of Germany | 384/282 |
| 1060501 | 4/1954 | France | 29/149.5 NM |

Primary Examiner—Howard N. Goldberg
Assistant Examiner—Ronald S. Wallace
Attorney, Agent, or Firm—Joseph Januszkiewicz

[57] ABSTRACT

A bearing assembly for supporting a drive shaft, having a housing with a central bore in which is mounted a shell with a polygonal shaped opening, a plurality of circumferential spaced staves are mounted in the polygonal opening presenting a plurality of flat planar surface that tengentially contact a drive shaft. The staves have a outer layer made of high molecular weight and an inner layer made of an elastomeric material. The staves are retained within the polygonal opening with the retainer rings. A method for manufacturing such a bearing assembly is disclosed, the method comprising placing a plurality of laminated, trapezoidal shaped staves about a polygonal shaped mandrel; wrapping a fiber fabric about the outer periphery and curing a resin coating placed thereon; and securing a pair of annular retainer rings thereabout to secure the staves to the cured shell.

9 Claims, 6 Drawing Figures

BEARING ASSEMBLY AND METHOD FOR ASSEMBLING A BEARING

This application is a division of patent application Ser. No. 525,521 filed Aug. 22, 1983, now U.S. Pat. No. 4,473,308.

BACKGROUND OF THE INVENTION

This invention relates to a bearing assembly and more particularly to elastomeric journal bearing assemblies which are adapted for use in supporting marine propeller shafts. Elastomeric journal bearings have been found to be particularly suited for this purpose because of their exceptional ability to withstand the effects of corrosive fluids and to abrasion resulting from bits of foreign materials which are carried in suspension in the sea water or other liquids in which the shaft and journal bearing assembly operates. Such elastomeric journal bearing assemblies have been made and are still being made with rigid metallic non-corrosive support members but the materials are more expensive and the manufacturing costs are higher. A further advantage of the elastomeric journal bearings is that since they operate in a liquid medium they are self lubricated and therefore highly desirable for marine use as for the stern propeller shaft journals.

The present invention is directed to a novel bearing assembly utilizing a novel outer shell and inner shell composed of replaceable staves wherein the integral assembly provides a plurality of circumferentially spaced radially inwardly extending projections that provides support for a rotating shaft in water. The invention employs a flat molding process that is combined with a winding process whereby a fiberglass reinforced rubber or elastomeric shell is further supported by a fiberglass reinforced plastic which provides a rigid outer housing for the inner flexible spaced removeable staves or bearing elements. A unique advantage of this invention is that the removeable staves are used in building the rigid housing assuring exact fitting in an economical manner. In this manufacturing process the rigid outer shell is machined to a precise outer diameter. Additional layers of fiberglass reinforced plastic can be molded onto the outer shell while maintaining the same diameter with its replaceable staves. The bearing assembly is simple in construction and can provide means for quickly repairing a bearing assembly while permitting the accurate sizing of the outer diameter without the use of expensive molding processes.

SUMMARY OF THE INVENTION

The present invention is directed to a new and improved bearing assembly having a rigid non-metallic outer shell and an inner shell composed of a plurality of circumferentially spaced staves which staves are trapezoid in cross section. Each stave is constructed from a semi-rigid material such as an ultra high molecular weight polyethylene which is bonded to an inner strip of an elastomer. The staves are held in circumferentially spaced relationship by suitable end caps.

DETAILED DESCRIPTION

Figure 1:
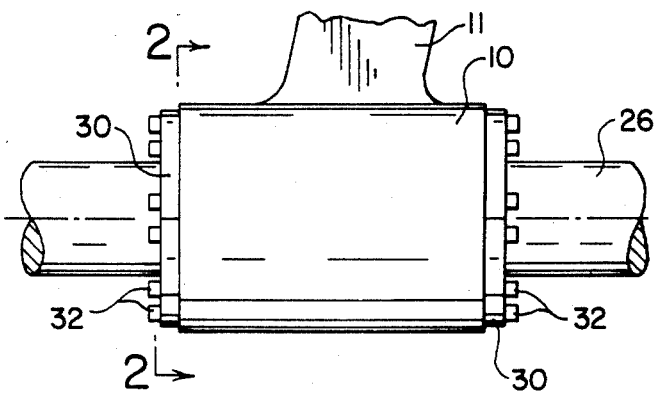
FIG. 1 is a side elevational view of a strut and bearing assembly for supporting a rotatable shaft.

Referring to the drawings, wherein like reference numerals designate like or corresponding parts throughout the several views, there is shown in FIG. 1 a longitudinally extending bearing housing 10 supported by a strut 11. Housing 10 has a pair of annular end sections 12, with each end section having a plurality of circumferentially spaced threaded bores 13. The housing 10 has a central bore 14 to accommodate a bearing unit to be described. The bearing unit has a plurality of circumferentially spaced staves 15 which include an inner trapezoidal shaped bearing element 17 made of an elastomeric material including natural rubber and an outer trapezoidal shaped bearing support element 18 that is made of a high molecular weight polyurethane that is bonded to the elastomeric bearing element 17.

An elastomer is defined as a substance that can be stretched at room temperatures to at least twice its original length and, after having been stretched and the stress removed, returns with force to approximately its original length in a short time. (See Glossary of Terms as prepared by ASTM Committee Dll on Rubber and Rubberlike Materials. Published by the American Society for Testing Materials).

The elastomeric or rubber material that can be used can be any of the well known elastomers including for example natural rubber, copolymers of butadiene and acrylonitrile, copolymers of butadiene and styrene, copolymers of butadiene and alkyl acrylates, butyl rubber, olefin rubbers such as ethylene-propylene and EPDM rubber, fluocarbons rubbers, fluroisilicone rubbers, silicone rubbers, chlorosulfonated polyethylene, polyacrylates, polybutadiene, polychloroprene and the like.

Figure 4:
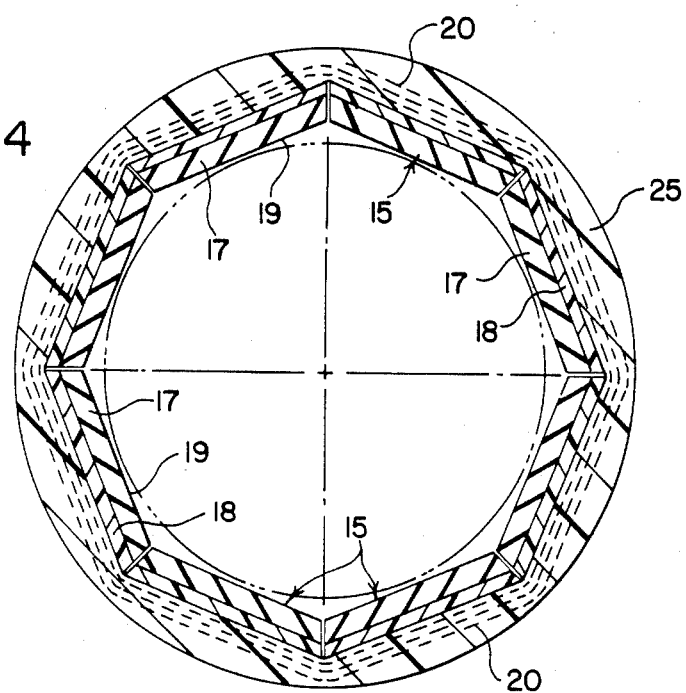
FIG. 4 is a cross-sectional view of the bearing assembly.
Figure 5:
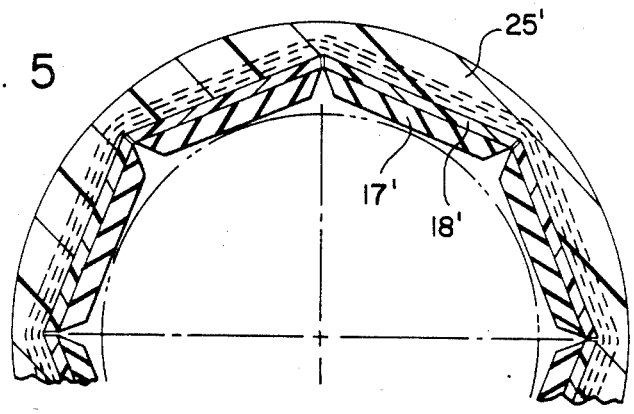
FIG. 5 is a partial cross-sectional view of a modification of the bearing assembly shown in FIG. 4

The bearing element 18 is made of high molecular weight polyethylene having a melt flow index less than 0.15. To prepare such bearing elements, an elongated flat sheet of elastomeric material such as nitrile rubbers, such as polymers of butadiene and acrylonitrile is placed flat into a mold and vulcanized. A second sheet of ultra high molecular weight polyethylene is then molded into a flat sheet. Each of these sheet individual are cut into proper length or strips having proper angularly disposed sides to provide their trapezoidal cross sectional shape. The first and second sheets may be bonded together first and then cut into trapezoidal shapes such that the elastomeric inner bearing element 17 has a smaller base 19 than the bearing support element 18 supporting such bearing element 17, as seen in FIGS. 4 and 5. Such base 19 is a radially diposed inner bearing surface. FIG. 4 shows the bearing elements 17 closely abutting each other with a slight clearance space between them for ease of assembling as will be discussed herein. The clearance space is controlled by the accuracy of the machining of the elements angles which can be different for inner bearing element 17 than the bearing support element 18. The joined inner bearing element 17 with the bearing support element 18 form the staves 15. The staves are placed on a mandrel and maintained thereon as by pulling a vacuum such that as the mandrel and staves are rotated a woven fabric of fiberglass designated 20 is wrapped or wound onto the outer peripheral surfaces of the staves. As the fiberglass 20 is wound thereon, the fabric is coated with an epoxy resin from a suitable reservoir or supply source as with the aid of a doctor blade to ensure uniform coating. The epoxy resin is applied manually or by any known mechanical means. The number of layers of impregnated fiberglass that is applied around the outer surfaces of the circumferentially spaced staves 15 is determined by the desired size needed. After the epoxy resin has set, the outer surface can be machined to the desired diameter to form an outer cylindrical shell 25.

Figure 2:
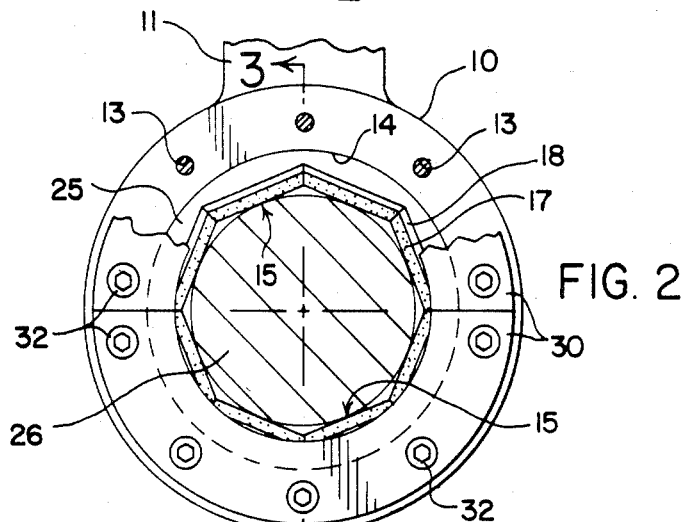
FIG. 2 is a front elevational view of the strut and bearing assembly taken on line 2—2 of FIG. 1 with a portion of the cap broken away to show the bearing staves.
Figure 3:
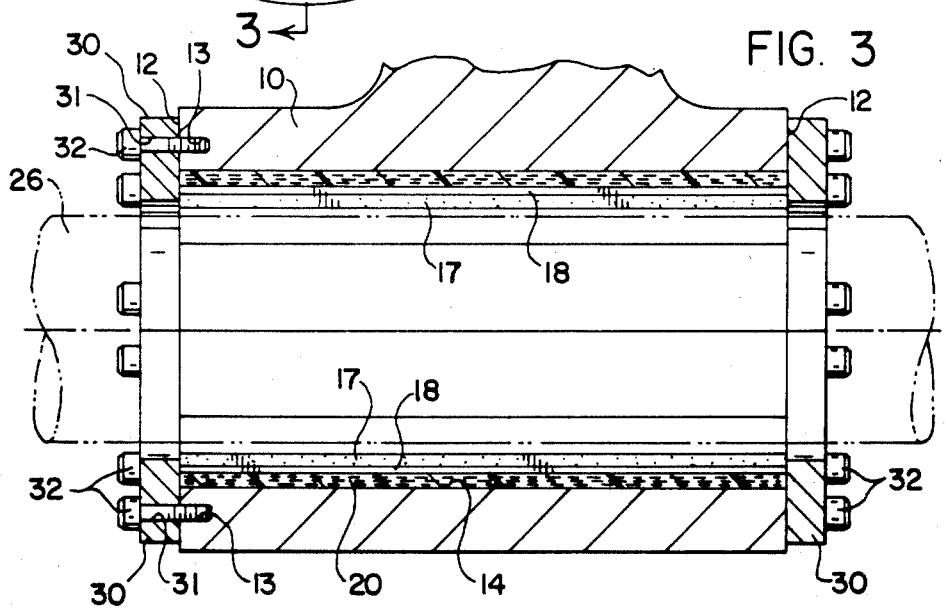
FIG. 3 is a side elevational view in cross-section of the strut and bearing assembly taken on line 3—3 of FIG. 2.

A specific example of the epoxy resin useful in the present invention is one by the tradename "APCO" available from Applied Plastics Co., Inc. of 612 Franklin Avenue, El Segundo, CA 90245. The epoxy resin has a specific gravity of 1.165 and its accompanying curing agent or hardener has a specific gravity of 1.809. The epoxy resin has a shore D 25° C. hardness of 84 with a glass transition temperature of 196° F. The viscosity of the epoxy resin is 2000 cps (1800±300); while the viscosity of the hardener is 410 cps (310 ±200). Another epoxy resin that can be used is one known as "EVER-FIX EPOXY RESIN" having a density of 8.5 lbs. per gallon. The hardner used with such epoxy resin is a modified alaphatic amine adduct available through Fibre Glass-Ever Cost Co., Inc. 66700 Cornell road, Cincinnati, Oh 45242. With this structure of the combined fiberglass reinforced outer shell 25 the stave like bearing elements 15 are replaceable. Such outer shell 25 and the staves 15 are located within the central bore 14 of housing 10, with the inner peripheral surfaces of the staves 15 abutting the drive shaft 26. As seen in FIGS. 2, 4 and 5, the staves 15 are shown with their adjacent edges abutting each other but with a sufficient clearance space to assure ease of replacement. The polygonal shaped central bore of the shell 25 prevents rotation of the staves within such shell. The conventional system has been to machine dove-tailed grooves into the outer supporting sleeve and then construct the staves to slide into the respective machined grooves. The staves 15 are retained within such central bore by a pair of semi-circular retainer rings 30 acting as retainer means mounted on the respective end sections 12 of the cylindrically shaped housing 10. Rings 30 have a plurality of circumferentially spaced bores 31 which receive cap screws 32 which are threaded into the respective threaded bores 13 to thereby securely fasten the staves 15 on the housing 10 in place on the shaft 26.

A modification of the described embodiment is shown in FIG. 5 wherein the clearance space between the respective edges of the staves are machined to form a greater angular gap between the inner elastomeric bearing elements 17′ while retaining the clearance space between adjacent trapezoidal shaped outer bearing support elements 18′. The outer fiberglass refinforced cylindrical shell 25′ is constructed identically to the cylindrical shell 25 of the first described embodiment.

Figure 6:
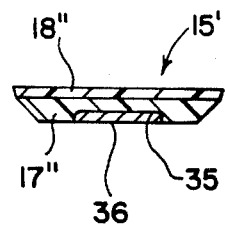
FIG. 6 is a cross-sectional view of a further modified form of a bearing stave.

A further modifification in the construction of a stave 15 is shown in FIG. 6, wherein the stave 15′ has an outer trapezoidal shaped bearing support element 18″ made of a high molecular weight polyethylene and an inner trapezoidal shaped bearing element 17″ made of an elastomeric material that has a groove 35 along the full length thereof with a suitable ceramic, plastic, glass or "Teflon" material molded or formed therein to present a flat inner surface 36 having a low coefficient of friction. This enhances the start up properties in the use of these staves for Cutless ® bearings. The above described fabrication and bearing assemblies are considerably more efficient and cost effective for the purposes as set forth therein when compared with those presently available.

Various modifications are contemplated and may be resorted to by those skilled in the art without departing from the described invention, as hereinafter defined by the appended claims, as only the preferred embodiments thereof have been disclosed.

I claim:

1. The method of making a bearing assembly having removable staves comprising the steps of building a flat rectangular layer of elastomeric material; vulcanizing said layer of elastomeric material; cutting said layer of elastomeric material into a plurality of strips; bonding each of said strips of elastomeric material to respective strips of ultra-high molecular weight material to form a plurality of individual bearing staves with trapezoidal cross sectional shape having an upper and lower flat surface; locating said staves onto a polygonal shaped mandrel with said layers of elastomeric material located radially inwardly to form a circumferential hoop whose outer peripheral surfaces defines a polygon bounded by straight sides; rotating said mandrel while wrapping a fiber fabric onto the outer periphery of said circumferentially spaced staves and impregnating said fiber fabric with a plastic resin; curing said resin to complete a fiber reinforced plastic outer shell having an inner periphery that is polygonal in contour which is non-adherent to said axially removable staves; and securing a pair of spaced annular rings to said outer shell to retain said staves in said shell.

2. The method of maing a bearing assembly as set forth in claim 1 wherein a clearance space is provided between adjacent layers of elastomeric material of said staves.

3. The method of making a bearing assembly as set forth in claim 1 wherein each of said layers of elastomeric material in each stave has its innermost radial portion receive an insert having a low coefficient of friction.

4. The method of making a bearing assembly as set forth in claim 1 wherein each of said layers of elastomeric material is grooved along its inner peripheral surface; and an insert having a low coefficient of friction material is positioned within each of said grooves to provide a bearing surface for a shaft that is to be rotated within said bearing assembly.

5. The method of making a bearing assembly as set forth in claim 4 wherein said inserts are made from ceramic material.

6. The method of making a bearing assembly as set forth in claim 4 wherein said inserts are made from Teflon material.

7. The method of making a bearing assembly comprising the steps of supplying a plurality of bearing staves that are trapezoidal in cross section with an outer flat layer of ultra-high molecular weight material and an inner flat layer of elastomeric material; securing said staves on a mandrel with said layers of elastomeric material contacting said mandrel defining a polygonal bearing surface; wrapping a fiber fabric onto the outer periphery of said staves and impregnating said fiber fabric with a plastic resin; curing said resin to form a fiber reinforced outer shell having an inner polygonal shaped contour; and retaining said staves in said outer shell by securing annular rings to said shell which abuttingly engage said staves.

8. The method of making a bearing assembly as set forth in claim 7 wherein the respective layers in each of said staves are trapezoidal in cross section.

9. The method of making a bearing assembly as set forth in claim 8 wherein the respective adjacent sides of said layers of elastomeric material subtend a greater angle than their supporting layer of ultra-high molecular weight material thereby providing a substantial clearance space between adjacent layers of elastomeric material.

* * * * *

UNITED STATES PATENT AND TRADEMARK OFFICE
CERTIFICATE OF CORRECTION

PATENT NO. : 4,577,379

DATED : March 25, 1986

INVENTOR(S) : James Harmon Kramer

It is certified that error appears in the above-identified patent and that said Letters Patent are hereby corrected as shown below:

Claim 2, line 1, "maing" should read ---making---.

Signed and Sealed this

Eighth Day of July 1986

[SEAL]

Attest:

DONALD J. QUIGG

Attesting Officer

Commissioner of Patents and Trademarks